United States Patent [19]

Landa et al.

[11] Patent Number: 5,972,548
[45] Date of Patent: Oct. 26, 1999

[54] PROCESS FOR FORMING AN IMAGE ON CERAMIC SUBSTRATES

[75] Inventors: Benzion Landa, Nes Ziona; Peretz Ben-Avraham, Rehovot, both of Israel

[73] Assignee: Indigo N.V., Maastricht, Netherlands

[21] Appl. No.: 08/930,608

[22] PCT Filed: Jun. 6, 1995

[86] PCT No.: PCT/NL95/00192

§ 371 Date: Oct. 14, 1997

§ 102(e) Date: Oct. 14, 1997

[87] PCT Pub. No.: WO96/33446

PCT Pub. Date: Oct. 24, 1996

[30] Foreign Application Priority Data

Apr. 16, 1995 [IL] Israel .......................................... 113393

[51] Int. Cl.$^6$ ............................ G03G 13/01; G03G 9/09; G03G 13/22
[52] U.S. Cl. ............................ 430/47; 430/110; 430/115; 430/126; 430/137
[58] Field of Search ................ 430/47, 115, 126, 430/110, 137

[56] References Cited

U.S. PATENT DOCUMENTS

| | | |
|---|---|---|
| 3,671,283 | 6/1972 | Crowley . |
| 3,766,125 | 10/1973 | Ernst et al. . |
| 3,775,237 | 11/1973 | Crowley . |
| 3,920,532 | 11/1975 | Ernst et al. ............................. 204/489 |
| 4,104,183 | 8/1978 | Tsubuko et al. ........................ 430/114 |
| 4,794,651 | 12/1988 | Landa et al. ........................... 430/115 |
| 4,820,605 | 4/1989 | El-Sayed ................................ 430/115 |
| 4,851,320 | 7/1989 | Stein ...................................... 430/198 |
| 4,971,858 | 11/1990 | Yamano et al. ......................... 428/323 |
| 5,047,808 | 9/1991 | Landa et al. ............................ 219/469 |
| 5,089,856 | 2/1992 | Landa et al. ............................ 219/216 |
| 5,346,796 | 9/1994 | Almog ................................... 430/115 |
| 5,358,822 | 10/1994 | Hou ....................................... 430/137 |

FOREIGN PATENT DOCUMENTS

| | | |
|---|---|---|
| 0317969 | 5/1989 | European Pat. Off. . |
| 0641671 | 3/1995 | European Pat. Off. . |
| 0647885 | 4/1995 | European Pat. Off. . |
| 1947906 | 4/1970 | Germany . |
| 2657326 | 7/1977 | Germany . |
| 3643397 | 2/1988 | Germany . |
| 1139091 | 1/1969 | United Kingdom . |
| 9013063 | 11/1990 | WIPO . |
| 9402887 | 2/1994 | WIPO . |

*Primary Examiner*—Roland Martin
*Attorney, Agent, or Firm*—Greenblum & Bernstein, P.L.C.

[57] ABSTRACT

A process for forming high quality colored or multi-colored ceramic images or designs on ceramic surfaces comprising: (a) forming a liquid toner image comprised of polymer based toner particles incorporating a ceramic pigment and a carrier liquid, on an imaging surface; (b) transferring the image to a ceramic surface; and (c) heating the image and the ceramic substrate surface to an elevated temperature at which the ceramic pigment sinter and fuse to the ceramic substrate surface.

19 Claims, No Drawings

PROCESS FOR FORMING AN IMAGE ON CERAMIC SUBSTRATES

FIELD OF THE INVENTION

The present invention relates to an electrostatic process for coating ceramic substrates with ceramic coatings. It also relates to a method of preparing toner containing ceramic pigments. The invention specifically relates to a versatile and efficient method to achieve ceramic images or designs on ceramic substrates and surfaces.

BACKGROUND OF THE INVENTION

Ceramic materials have wide use in applications where it is desirable to coat them with decorative or functional colored or multi-colored designs and images that also possess the usual ceramic properties, such as chemical and mechanical stability.

Present conventional processes for coating ceramic surfaces with decorative or functional designs and images comprise forming an image using lithographic inks containing ceramic pigments on an intermediate structure, namely a starch coated paper, transfer of the printed images to a ceramic blank and firing of the image to melt the pigments and vaporize any organics left in the image. However, such processes are not suitable for short run ceramic printing or for printing ceramic tiles or other products in serial fashion.

SUMMARY OF THE INVENTION

It is an object of certain aspects of the present invention to produce high quality color images and designs on ceramic substrates. The present application discloses a novel charged toner pigmented with ceramic pigments, methods of manufacturing the toner and processes for forming images on ceramic substrates.

There is therefore provided, in accordance with a preferred embodiment of the invention, a toner suitable for forming images on a ceramic substrate comprising:

toner particles comprising a polymer and a ceramic pigment; and a non-polar carrier liquid.

There is further provided, in accordance with a preferred embodiment of this invention, a process for forming high quality colored or multi-colored ceramic images or designs on ceramic surfaces comprising:

(a) forming a liquid toner image comprised of polymer based toner particles incorporating a ceramic pigment and a carrier liquid, on an imaging surface;

(b) transferring the image to a ceramic surface; and (c) heating the image and the ceramic substrate surface to an elevated temperature at which the ceramic pigment sinters and fuses to the ceramic substrate surface.

In a preferred embodiment of the invention, transferring the image to the ceramic surface comprises:

transferring the image to an intermediate transfer member; and transferring the image from the intermediate transfer member to the ceramic substrate.

Preferably, transferring the image from the intermediate transfer member to the substrate comprises:

transferring the image from the intermediate transfer member to a transfer sheet; and transferring the image from the transfer sheet to the ceramic substrate.

In an alternative preferred embodiment of the invention, transferring the image from the intermediate transfer member to the substrate comprises:

transferring the image from the intermediate transfer ember to a transfer sheet; and placing the sheet on the ceramic substrate; wherein (c) includes heating the ceramic substrate and the transfer sheet together to cause said sintering and fusing and also volatilization of the sheet.

In a preferred embodiment of the invention, the forming of the liquid toner image and its transfer to the intermediate transfer member are repeated sequentially for a plurality of pigment colors and a composite color image is transferred from the intermediate transfer member to the substrate.

There is further provided, in accordance with a preferred embodiment of the invention, a process for preparing ceramic pigmented toner inks comprising:

(a) solubilizing a toner polymer in a carrier liquid by heating and stirring the mixture;

(b) adding pre-dispersed ceramic pigments to the product of (a);

(c) mixing the result of (b) as the mixture cools.

There is further provided, in accordance with a preferred embodiment of the invention, a method for producing toner suitable for forming images on a ceramic substrate comprising:

(a) plasticizing a thermoplastic material with a nonpolar liquid at an elevated temperature;

(b) cooling the plasticized material and forming polymer particles having a size suitable for wet grinding;

(c) adding more non-polar liquid and a ceramic pigment to the plasticized material;

(d) wet grinding the plasticized material and ceramic pigment; and (e) continuing the grinding to pull the particles apart and form fibers extending therefrom.

The polymer toner may be an ionomer, preferably a low molecular weight ionomer, a ethylene methacrylic acid copolymer such as Nucrel 599 (duPont) or other polymer which volatilizes cleanly at or below the sintering temperature of the ceramic pigment.

DESCRIPTION OF THE PREFERRED EMBODIMENTS OF THE INVENTION

Fired ceramic images in accordance with one preferred embodiment of the invention are achieved by forming colored or multi-colored images or designs, preferably electrostatically, using charged toner inks containing ceramic pigments, and transferring the thus formed image to the surface of a ceramic substrate. The ceramic substrate, having the ink image thereon is heated to an elevated temperature, usually in the range of 700° C.–1800° C., to cause sintering of the respective ceramic pigment particles into cohesive color layers. The heating step also causes fusion of the various pigment layers to each other as well as to the ceramic substrate with minimum mixing of colors, and the elimination of all residual organic components of the toner inks, binders and optionally the transfer materials, by pyrolysis and volatilization.

In order to avoid unnecessary alignment and registration steps, in the image forming and transfer stages of the printing process the different color images involved are preferably sequentially transferred each in alignment with previous images onto an intermediate transfer member. Each complete image is transferred from the intermediate transfer member to a transfer substrate preferably with heat and pressure.

In one embodiment of the invention the transfer substrate is a polymer film that can subsequently be eliminated by pyrolysis.

Polyester, EVA and high density ionomer films are particularly useful for this purpose. When such polymer films are used, the image transfer is arranged so that a reverse image is imprinted on it. The image imprinted plastic film is then placed on a ceramic substrate.

Upon heating the ceramic surface and the image imprinted plastic film to elevated temperatures, in the range of 700° C.–1800° C., the ceramic color particles sinter into cohesive color layers, the various pigment layers fuse to each other and the ceramic substrate surface, and the organic materials from the toner ink and the transfer film are eliminated by pyrolysis and volatilization.

In another embodiment of the invention the transfer substrate to which the image is transferred from the intermediate transfer member is paper coated with a water soluble starch such as that typically used in the art of ceramic printing. The image on the starch paper is coated with a film forming lacquer. The film, that is formed in this way, provides the image with mechanical reinforcement so that it does not fall apart in subsequent transfer manipulations.

Wetting the soluble starch coated paper allows the film reinforced image to be removed and placed on the ceramic surface. Upon heating, as described above, the pigment particles are sintered into a cohesive color image which is fused to the ceramic surface and residual organic material is eliminated by pyrolysis and volatilization.

Many aspects of the invention are applicable to a wide range of systems, methods and devices as known in the art for forming images using liquid toner, preferably however, an electrostatic system and more preferably the Indigo E-Print 1000 printing system operating in the one-shot mode or an Indigo Omnius printing system (marketed by Indigo N.V., Holland) have been found to be most suitable in the said respect and to give high quality ceramic images in a most satisfactory manner, when used in accordance with the present invention.

Exemplary preferred printing systems suitable for carrying out the invention are described in U.S. Pat. No. 5,089,856 or U.S. Pat. No. 5,047,808 or in U.S. patent application Ser. No. 08/371,117, filed Jan. 11, 1995 and entitled IMAGING APPARATUS AND INTERMEDIATE TRANSFER BLANKET THEREFOR and in coresponding applications filed in other countries, the disclosures of which are incorporated herein by reference.

Methods of preparing liquid toners suitable for the present invention are given in the following non-limiting examples:

EXAMPLES

Preparation of Ceramic Pigmented Liquid Toner Ink-Process A

A preferred liquid toner for use in the present invention is prepared as follows:

200 grams of a chargeable low molecular ionomer Aclyn 293A (made by Allied Signal) is solubilized in 800 grams of Isopar-L (EXXON) by heating to 100° C.–110° C. while stirring the mixture. 200 grams of Black Process MBC (made by Johnson Mathey) were slowly added and mixing is continued until the material is well dispersed. The heating is terminated and the material is allowed to cool to 35° C. while mixing is continued.

This results in a particle size of about 5.5 micrometers. The material is diluted with additional Isopar L to give a dispersion having a 2% non-volatile solids concentration and charge director such as described in U.S. patent application Ser. No. 07/915,291 (utilizing lecithin, BBP and ICIG3300B) and in WO 94/02887, in an amount equal to 40 mg/gm of solids, is added to charge the toner particles. Other charge directors and additional additives as are known in the art may also be used.

Color toners may be produced by replacing the Black Process MBC by an equal quantity of Yellow, Cyan or Magenta process MBC.

Preparation of Ceramic Pigmented Liquid Toner Ink-Process B

An alternative preferred method for preparing liquid toner in accordance with the invention comprises:

1) Solubilizing 140 grams of Nucrel 599 (ethylene methacrylic acid copolymer by duPont) and 140 g of Isopar L (Exxon) are thoroughly mixed in an oil heated Ross Double Planetary Mixer at about 24 RPM for 1.5 hours, with the oil temperature at 130° C. 120 g of preheated Isopar L is added and mixing is continued for an additional hour. The mixture is cooled to 45° C., while stirring is continued over a period of several hours, to form a viscous material.

2) Milling and Grinding 49.6 grams of the result of the Solubilizing step are ground in a 1S attritor (Union Process Inc. Akron Ohio), charged with 3/16" carbon steel balls at 250 RPM, together with 19.6 grams of Noir Quadri MBC black pigment (Johnson Matthey), 0.78 grams of aluminum stearate and an additional 130 grams of Isopar L for 18 hours at 30° C. The resulting particle size is about 3 micrometers.

3) Dilution and Charging The material produced in step 2) is diluted with additional Isopar L to give a dispersion having a 2% non-volatile solids concentration and charge director such as described in U.S. patent application Ser. No. 07/915,291 (utilizing lecithin, BBP and ICIG3300B) and in WO 94/02887, in an amount equal to 40 mg/gm of solids, is added to charge the toner particles. Other charge directors and additional additives as are known in the art may also be used.

Color toners may be produced by replacing the Noir Quadri MBC black pigment by an equal quantity of Yellow, Cyan or Magenta process MBC.

Many aspects of the invention are applicable to a wide range of systems, methods and devices as known in the art for forming images using liquid toner, preferably however, an electrostatic system and more preferably one of the Indigo printing systems listed above have been found to be most suitable in the said respect and to give high quality ceramic images in a most satisfactory manner, when used in accordance with the present invention.

It will be appreciated by persons skilled in the art that the present invention is not limited by the description and examples provided herein above. For example, other ceramic pigments, carrier liquids, charge directors and toner polymers may be used in the present invention. It should be noted however, that polymers used for both the toner and the transfer sheet should volatilize cleanly to avoid contamination of the image. Rather, the scope of this invention is defined only by the claims which follow:

We claim:

1. A toner suitable for forming sintered ceramic pigment images on a ceramic substrate comprising:
   toner particles comprising a polymer having a non-white ceramic pigment particles dispersed therein;
   a charge director which promotes electrostatic charging of the toner particles such that the toner is suitable for the development of electrostatic images,
   wherein images formed of the toner form, after sintering, a coherent color layer which adheres to a ceramic surface.

2. A toner according to claim 1 wherein the polymer comprises an ionomer.

3. A toner according to claim 2 wherein the ionomer is a low molecular weight ionomer.

4. A toner according to claim 1 wherein the polymer is an ethylene methacrylic acid copolymer.

5. A process for forming high quality colored or multicolored ceramic images or designs on ceramic surfaces comprising:
  (a) electrostatically forming a liquid toner image on an imaging surface, the image being comprised of:
    electrically charged polymer based toner particles incorporating a ceramic pigment; and
    a non-polar carrier liquid;
  (b) transferring the image to a ceramic surface; and
  (c) heating the image and the ceramic surface to an elevated temperature at which the ceramic pigment sinter and fuse to the ceramic surface to form an image thereon.

6. A process according to claim 5 wherein transferring the image to the ceramic surface comprises:
  transferring the image to an intermediate transfer member; and
  transferring the image from the intermediate transfer member to the ceramic surface.

7. A process according to claim 6 wherein transferring the image from the intermediate transfer member to the substrate comprises:
  transferring the image from the intermediate transfer member to a transfer sheet; and
  transferring the image from the transfer sheet to the ceramic surface.

8. A process according to claim 6 wherein transferring the image from the intermediate transfer member to the ceramic surface comprises:
  transferring the image from the intermediate transfer member to a transfer sheet; and
  placing the sheet on the ceramic surface; wherein (c) includes heating the ceramic surface and the transfer sheet together to cause said sintering and fusing and also volatilization of the sheet.

9. A process according to claim 7 wherein forming of the liquid toner image and its transfer to the intermediate transfer member are repeated sequentially for a plurality of pigment colors and a composite color image is transferred from the intermediate transfer member to the ceramic surface.

10. A process according to claim 5 wherein the toner polymer comprises an ionomer.

11. A process according to claim 10 wherein the ionomer is a low molecular weight ionomer.

12. A process according to claim 5 wherein the toner polymer is an ethylene methacrylic acid copolymer.

13. A method of producing toner suitable for forming sintered images on a ceramic substrate, the method comprising:
  (a) solubilizing a toner polymer with a carrier liquid at an elevated temperature;
  (b) adding at least one non-white ceramic pigment to the product of (a);
  (c) forming toner particles from said polymer and ceramic pigment; and
  (d) adding a charge director to promote electrostatic charging of the toner particles.

14. A method for producing toner suitable for forming sintered images on a ceramic substrate according to claim 13, wherein:
  solubilizing a toner polymer comprises:
    solubilizing a toner polymer in a carrier liquid by heating and stirring the mixture; and
  adding at least one ceramic pigment comprises:
    adding at least one non-white ceramic pigment to solubilized toner polymer; and
    continuing mixing the result as the mixture cools.

15. A method according to claim 14 wherein the toner polymer is an ionomer.

16. A method according to claim 15 wherein the ionomer is a low molecular weight ionomer.

17. A method for producing toner suitable for forming sintered images on a ceramic substrate according to claim 13, wherein:
  solubilizing a toner polymer comprises:
    plasticizing a thermoplastic material with a non-polar liquid at an elevated temperature; and
    cooling the plasticized material and forming polymer particles having a size suitable for wet grinding;
  adding at least one ceramic pigment comprises:
    adding more non-polar liquid and a ceramic pigment to the plasticized material;
  and further including:
    wet grinding the plasticized material and ceramic pigment; and
    continuing the grinding to pull the particles apart and form fibers extending therefrom.

18. A method according to claim 17 wherein the toner polymer is an ethylene methacrylic acid copolymer.

19. A process according to claim 8, wherein forming of the liquid toner image and its transfer to the intermediate transfer member are repeated sequentially for a plurality of pigment colors and a composite color image is transferred from the intermediate transfer member to the ceramic substrate.

* * * * *